United States Patent [15] 3,635,835
Peterson [45] Jan. 18, 1972

[54] GELLED ACIDIC COMPOSITIONS

[72] Inventor: Marvin L. Peterson, Woodstown, N.J.
[73] Assignee: E. I. du Pont de Nemours and Company, Wilmington, Del.

[22] Filed: Aug. 20, 1969
[21] Appl. No.: 871,342

Related U.S. Application Data

[62] Division of Ser. No. 663,495, Aug. 28, 1967, Pat. No. 3,507,720.

[52] U.S. Cl. ....252/315, 71/58, 71/59, 71/64 A, 71/64 C, 252/8.55 C, 252/79.2, 252/79.4, 252/145, 252/186, 252/316, 260/29.6 AN, 260/29.6 CM
[51] Int. Cl. ....B01j 13/00
[58] Field of Search ....149/19, 20, 55, 56, 57, 60, 149/61, 67, 69, 74, 105; 252/315, 316, 145; 260/29.6 AN, 29.6 CM

[56] References Cited

UNITED STATES PATENTS

| | | | |
|---|---|---|---|
| 2,658,045 | 11/1953 | Schildknecht | 260/29.6 |
| 3,046,201 | 7/1962 | White et al. | 252/316 X |
| 3,483,172 | 12/1969 | Shibukawa et al. | 260/29.6 X |

*Primary Examiner*—Richard D. Lovering
*Attorney*—John F. Schmutz

[57] ABSTRACT

Aqueous acidic compositions gelled with a polymer having pendent amide or nitrile functions cross-linked by a monomer containing a plurality of —($CH_2OR$) groups bonded to amido nitrogen and a process for their preparation. The gelling system of this invention finds particular utility in explosive compositions based on an oxidizing agent and one or more fuels or sensitizers.

18 Claims, No Drawings

GELLED ACIDIC COMPOSITIONS

CROSS-REFERENCE TO PRIOR APPLICATION

This is a division of application Ser. No. 663,495, filed Aug. 28, 1967, now U.S. Pat. No. 3,507,720.

BACKGROUND OF THE INVENTION

The handling of liquid acidic compositions has long been a complicating factor in their use in various industries such as oil production, propellants, metallurgy, fertilizers and explosives, due to the inherent corrosiveness and, in some cases, strong oxidizing capacity of the acids. In more recent years, there has been increased interest in developing means of safely handling acidic compositions. This interest has been particularly evident in the explosives industry particularly with respect to compositions containing an inorganic oxidizing agent together with sensitizer or fuel components since the discovery of the greater work potential of water-bearing compositions containing these constituents. Since the constituents of such explosive compositions exhibit varying degrees of solubility, difficulty was encountered in maintaining the homogeneity of aqueous explosive compositions of this type. The use of such compositions for blasting in wet boreholes was still further complicated by the seepage of water into the explosive compositions, altering the constitution of the composition by dilution and leaching of the soluble components.

To help solve these problems, various thickeners or gelling agents have been used with slurried explosive compositions based on inorganic oxidizing salts. Satisfactory thickener systems for these compositions are based on natural hydroxylated polymers such as natural polysaccharides, particularly galactomannan gums and their derivatives.

The versatility of these systems is increased by the provision of various cross-linking agents which gel the compositions thereby increasing the stability of the system and usually imparting other beneficial effects. Some variations in product consistency is possible by varying the proportions of hydroxylated polymers and cross-linking monomers in the compositions, but usually water resistance is seriously deficient at concentrations low enough to provide readily pourable compositions. In particular there is a now well-recognized need for a gelling system for aqueous compositions which will provide stable, pourable compositions which exhibit good water resistance as well as being of use in forming the more conventional firm, highly viscous gels.

While the gelling systems of the prior art provide satisfactory performance for most aqueous compositions based on inorganic oxidizing salts which are to be of relatively high viscosity, renewed interest in explosives based on nitric acid, i.e., compositions sometimes referred to as Sprengel explosives, has presented new problems since the known thickening and gelling systems are not satisfactory in the strong acid. For example, explosives based on concentrated nitric acid as the primary oxidizing component exhibit exceptionally high acidity and oxidizing capacity which are particularly hazardous in fluid compositions. Further, the use of these compositions in wet conditions is accompanied by generation of high temperatures due to dilution of nitric acid with water. Gelling systems of the types used in compositions based on inorganic oxidizing salts tend to decompose under acidic conditions. In addition, these gelling systems in general require careful control of pH during formation, which control is not possible in the nitric acid based compositions, and are not operable in a highly acidic medium. Thickening of the nitric acid based compositions, e.g., by inorganic fillers or linear polymers, does not provide stable, cohesive, water-resistant resistant compositions having premium explosive properties.

SUMMARY OF THE INVENTION

Accordingly, there is still a need for aqueous acidic compositions having a gelling system which can be used in a wide range of acidic compositions to give stable, water-resistant cohesive products ranging from pourable, yet water-resistant fluids to rigid gels. The instant invention provides compositions of improved homogeneity, water resistance and stability which help meet this need.

The instant invention provides an improvement in gelled aqueous acidic compositions, the improvement comprising a gelling system comprising the in situ cross-linked reaction product of at least one polymer containing a plurality of pendent groups selected from amide and nitrile functions, the amide nitrogen atoms bearing at least one hydrogen, and at least one monomer containing a plurality of $-CH_2OR$ groups bonded to amido nitrogen, wherein R is selected from hydrogen and lower alkyl of up to four carbon atoms. Preferably the polymer comprises about from 0.1 to 10 percent by weight of the acidic composition and the monomer comprises about from 0.5 to 50 percent by weight of the polymer. While the instant invention is useful for gelling various acidic compositions such as nitric acid, to facilitate their handling and use, it finds particular utility when used in conjunction with acidic explosive compositions comprising one or more fuels and an oxidizing component. This invention further provides a process for the manufacture of these gelled compositions which comprises bringing into contact, in an aqueous composition having a pH of less than about 6.0, at least one polymer containing a plurality of pendent substituent groups selected from amide and nitrile functions, the amide nitrogen atoms bearing at least one hydrogen, and at least one monomer containing a plurality of $-CH_2OR$ groups bonded to amido nitrogen, wherein R is as defined above.

DESCRIPTION OF PREFERRED EMBODIMENTS

The gelling system of this invention can be used with a wide range of acids including the common mineral acids such as nitric acid, perchloric acid, sulfuric acid, hydrochloric acid, and phosphoric acid and water soluble or miscible organic carboxylic acids having a dissociation constant in water of at least about $1\times10^{-5}$ such as lower aliphatic monocarboxylic acids. These can include, for example, formic, acetic, propionic, butyric or isobutyric acid, lower aliphatic di- and polycarboxylic acids of two to seven carbon atoms such as oxalic acid, malonic acid, succinic acid, and glutaric acid. The pH of the acidic compositions is less than about 6.0 and preferably less than about 5.5. Of the above-named acids, the mineral acids and salts derived therefrom whose aqueous solutions are acidic, e.g., ammonium nitrate, are particularly well suited for forming the gelled structures of this invention. In gelling organic acids, the presence of small quantities of a mineral acid can be desirable to speed gelation. Aqueous nitric acid and aqueous solutions of ammonium nitrate are particularly preferred acidic compositions to be gelled in accordance with this invention since, as will be described and exemplified more fully hereinafter, there is a particular utility for these inter alia in the formulation of explosive compositions. Nitric acid of about from 5 to 99 percent strength can be used; but nitric acids having concentrations of greater than 50 percent are most often used, and concentrations of about from 65 to 98 percent are particularly preferred.

In addition to its usefulness in gelling substances which are considered as acids per se, the gelling system of this invention also finds utility with aqueous acidic solutions of compatible substances. Examples of such substances include: ammonium nitrate, ammonium perchlorate, ammonium chlorate, ammonium sulfate, ammonium bisulfate, and ammonium phosphate and solutions or suspensions of other compositions, e.g., sugar, which have been made acidic.

In this specification the term "lower alkyl" means an alkyl radical of from one to four carbon atoms, unless otherwise indicated.

Polymers which can be used in accordance with this invention include, for example, 1. polymers of which at least about 2 percent of the units are

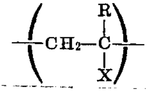

wherein X is selected from —CN and

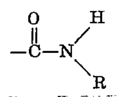

, and the R's can be the same or different and each is independently selected from the group consisting of hydrogen, lower alkyl, hydroxyalkyl, or cyanoalkyl radicals having up to four carbon atoms, and 2. a polymer containing recurring units of the formula

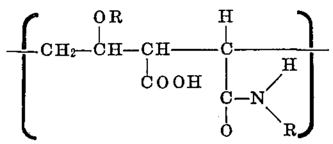

wherein R is as defined above.

Examples of such polymers which are especially suitable for use in accordance with this invention from the viewpoint of solubility and dispersibility in the liquid phase of the acidic compositions and availability at reasonable cost include poly(acrylic amides) which are polymers of acrylamide or methacrylamide, polymers of N-substituted derivatives of acrylic amides such as N-methylacrylamide, N-ethylacrylamide, and N-methylmethacrylamide, and polymers of hydroxyalkyl derivatives of amides such as $\alpha$,2-hydroxyethyl acrylamide and $\alpha$-hydroxymethacrylamide. Examples of poly(acrylic nitriles) which can be used in this invention include polymers of acrylonitrile, methacrylonitrile, $\alpha$-butylacrylonitrile, and $\alpha$-hydroxymethacrylonitrile. In general, homopolymers of the above-mentioned acrylic amides or nitriles or their mutual copolymers are preferred polymers because of their low cost and ease of dissolution in percent, wide range of acidic liquids. Particularly preferred polymers are homopolymers of acrylamide and of acrylonitrile and copolymers of acrylamide and acrylonitrile in ratios varying about from 1/20 to 20/1. Copolymers comprising at least about 2 percent of amide or nitrile units as defined above and the balance other copolymerized units can also be used. Representative copolymerizable monomers include acrylic monomers, e.g., acids such as acrylic acid, methacrylic acid, $\alpha$-ethyl acrylic acid and $\alpha$-propyl acrylic acid; esters such as methyl acrylate, methyl methacrylate, ethyl acrylate, n-butyl methacrylate and n-hexyl acrylate; cycloalkyl substituted acrylics, e.g., cyclohexyl methacrylate; salts such as sodium or ammonium acrylate or alkyl ammonium acrylates; hydroxyalkyl acrylates, e.g., 2-hydroxyethyl acrylate or 2-hydroxypropyl acrylate; cyanoalkyl acrylics such as $\alpha$-cyanoethylacrylonitrile; nonacrylic monomers such as sodium styrene sulfonate, vinyl acetate, vinyl pyridine and vinyl pyrrolidone and mixtures of two or more of such monomers, providing the copolymer formed meets the solubility and stability requirements set forth. Although low concentrations of monomers having pendent amide or nitrile functions in the copolymers can sometimes be used, e.g., as low as 1 to 2 percent, these monomers usually will comprise at least about 2 percent of the copolymer. Preferred polymers include vinyl addition polymers soluble in the systems used herein, preferably having a molecular weight of about from 50,000 to 6,000,000. Cross-linking monomers which can be used in accordance with this invention can be selected from any compound having a plurality of ($CH_2OR$) groups bonded to amido nitrogen. Each —$CH_2OR$ group can be bonded to a separate nitrogen atom, forming a plurality of —N—$CH_2OR$ groups, or, alternatively, two $CH_2OR$ groups can be attached to a single nitrogen atom. Such monomers include, for example, poly(hydroxymethyl)ureas such as N,N'-bis(hydroxymethyl)urea, i.e., dimethylolurea; N,N'-bis(alkoxymethyl)ureas such as N,N'-bis(methoxymethyl)urea and N,N'-bis(ethoxymethyl)urea; poly(hydroxymethyl)aliphatic amides such as methylene-bis-(N-hydroxymethylformamide), N,N'-bis(hydroxymethyl)adipamide, N,N'-bis(hydroxymethyl)sebacamide, N,N'N''-tris(hydroxymethyl)melamine, hexakis(hydroxymethyl)melamine, bis(hydroxymethyl)formamide, N,N-bis(hydroxymethyl)acrylamide; N,N'-(alkoxymethyl)aliphatic diamides such as N,N'-bis(methoxymethyl)sebacamide; N,N'-substituted dinitramines such as N,N'-bis(hydroxymethyl)hexamethylene dinitramine; N,N'-substituted sulfamides such as N,N'-bis(hydroxymethyl)N,N'-dimethyl sulfamide and N,N'-bis(methoxymethyl)N,N'-dimethyl sulfamide; and N,N'-substituted disulfonamides such as N,N'-bis(hydroxymethyl)-1,6-bis(methylsulfonamido)hexane, and mixtures of two or more of the above.

Of the above illustrative cross-linking monomers, N,N'-bis-(hydroxymethyl)urea is especially preferred for the compositions of the instant invention.

The term "soluble in the aqueous acidic component" and similar terms as used herein, refers to components having appreciable solubility at ambient temperatures, i.e., about 20° to 25° C., in the particular aqueous, acidic component to be gelled. In general, this solubility should be at least about 10 percent by weight and preferably appreciably greater, e.g., 50 percent or more. The reaction between acrylic polymer and cross-linking monomer should not preferentially form products which separate, e.g., by precipitation, from the aqueous acidic composition or agglomerate into flocculates or "lumps." Cross-linking of the polymer chains forms a structure which is a gel rather than a precipitate. This gelled structure swells in and holds the aqueous, acidic composition and is of substantially constant composition throughout. The gelled cross-linked structure contains a relatively low ratio of polymer solids to liquid phase, e.g., less than about 1 to 10, this ratio being roughly equal to the weight ratio of combined polymer and monomer to the liquid phase, in contrast to precipitates or agglomerates in which there is a high ratio of polymer solids to liquid phase.

The gelled compositions of this invention are stable. That is, there is little or no degradation of the polymer, cross-linking monomer or their reaction products in the aqueous acidic composition to be gelled. Since prolonged stability is particularly desirable, stability refers particularly to absence of degradation of a cross-linked system when subjected to accelerated thermal stability tests which involve heating the sample at a temperature of 50° C. (122° F.) for a period of at least 8 to 12 hours.

Strength, when used herein with regard to acids, particularly to nitric acid, expresses in percent the relationship between the weight of 100 percent (dry) acid and the weight of acid plus water in the particular acid.

The polymer for the gelling system preferably is provided as preformed polymer. However, if desired, the polymer can be formed in situ in the acidic liquid in the presence of free-radical polymerization initiators which are soluble to the extent of at least about 0.1 percent in the acidic liquid. Suitable initiators include sodium, potassium and ammonium salts of inorganic peracids; hydrogen peroxide; and organic peroxide and azo catalysts. Generally, persulfates are preferred. The persulfate ions, which are introduced as a soluble persulfate salt, can be used along in the solution of inorganic oxidizing salt to promote the polymerization reaction or an added reducing agent can also be employed to form a redox couple.

Formation of firm gel compositions can be completed in reasonably short times, e.g., less than about 30 minutes, at temperatures of about 20° to 25° C., particularly in strong oxidizing acids such as nitric acid. Rapid gelling is facilitated by using polymers of relatively high molecular weight, i.e., of one up to 6,000,000 or higher for polyacrylamide.

Preformed polyacrylamides which can be used in this invention include "Cyanomer" P–250, commercially available from American Cyanamide and Polyhall 295M commercially available from Stein Hall. Particularly preferred polyacrylonitriles are "Orlons," commercially available from Du Pont and those prepared by emulsion polymerization techniques according to Sorenson and Campbell, *Preparative Methods of POlymer Chemistry*, p. 169. Preferred copolymers consist of 2 to 25 percent acrylamide and 98 to 75 percent acrylonitrile prepared by emulsion polymerization in accordance with Encyclopedia of Polymer Science and Technology, Vol. I, p. 400; these copolymers have intrinsic viscosities in 0.1 percent solutions in dimethylformamide at 30° C. of 8.0 to 10.0. As will be exemplified below, gels of very desirable properties can be formed from lower molecular weight polymers but higher molecular weight polymers form gels more rapidly at lower temperatures and, in addition, usually require the use of less cross-linking monomer to provide gels of equivalent properties, other ingredients and conditions remaining the same.

The amide monomers employed for in situ polymerization in the explosive compositions of this invention need not be highly purified. For example, crude acrylamide sulfate obtained by the hydrolysis of the corresponding nitrile, acrylonitrile, in the presence of concentrated mineral acid, e.g., sulfuric acid, can be used directly without purification. The presence of the minor residual amounts of mineral acid in the crude monomer catalyzes the cross-linking reaction making possible faster gel times and exerts no detrimental effect in the explosive composition. Additional acid, such as sulfuric acid, can be added in amounts of about from 0.5 to 5 percent as a positive catalyst to hasten gelling of the aqueous phase of the compositions.

The amount of polymer used in the gelling system will generally vary from about 0.1 to 10 percent by weight of the liquid acidic composition and preferably about from 0.5 to 5 percent by weight. About from 0.5 to 50 percent of the cross-linking monomer based on the weight of the acrylic polymer will usually be employed.

Preparation of the gelled compositions of this invention can be accomplished by simply incorporating the polymer (preformed or formed in situ) and cross-linking monomer into the liquid acidic medium. There is no need for any catalyst and reaction between the polymer and cross-linking monomer in most cases begins shortly (within seconds) after addition of the polymer and monomer. Usually the polymer is admixed with the acidic composition and the cross-linking monomer subsequently added to the composition.

In general, gels form more rapidly when heat, e.g., of about from 30° to 80° C., is applied than when the reaction is carried out at or near ambient room temperature. However, when the acidic composition is also a strong oxidizer and particularly when it is nitric acid, heating to temperatures above about 50° C. preferably should be avoided. In the preparation of blasting compositions based on aqueous solutions of inorganic nitrate it is particularly convenient to use concentrated aqueous solutions of ammonium nitrate commonly known in the art as ammonium nitrate liquor, the aqueous liquid phase of the composition being provided for the most part by this solution. In forming the gelled compositions of this invention care should be taken that all ingredients, viz, the polymer, cross-linking monomer and, if desired, any solid to be dispersed in the gel, are uniformly dispersed through the composition. Agitation used for blending and dispersing of components is desirably continued until the composition is gelled, particularly when particulate solids for example, fuels or sensitizers such as TNT, smokeless powder and/or aluminum used in explosive compositions, are to be distributed uniformly through the gel matrix. In some instances, for example, in explosive compositions which are to contain a high percentage of solid TNT or when a solid which inhibits polymerization or the cross-linking reaction is to be incorporated in the compositions, all ingredients except such additives can be mixed and gelled and such additives blended into the gel formed.

When the polymer is to be formed in situ, the rate of polymerization and, in some instances, product consistency can be adversely affected by the presence of nitrogen oxides and oxygen, either in dissolved form or as the gases, and by the presence of large amounts of compounds conventionally used to inhibit free-radical polymerization of the monomers. Compensations for these variations can be provided, when necessary, by increasing the concentrations of polymerization promoters. An alternative and generally more economical expedient, however, is to reduce the concentrations of these polymerization-retarding components prior to the polymerization. In the case of nitrogen oxides and oxygen, this can be accomplished by carrying the polymerization out under a blanket of an inert gas, typically nitrogen. To further eliminate polymerization inhibiting concentrations of nitrogen oxides and/or oxygen, the components of the blasting composition, particularly the aqueous solution of inorganic oxidizing salt, can be sparged with the inert gas. When preformed polymer is used, as is preferred, there is no need to sparge the components.

The rate of gelling and the viscosity of the gelled compositions of this invention can be varied according to the needs of a particular application. In general, the rate of gelling and the viscosity of the gel can be increased by increasing the percentage of polymer in the system, by increasing the relative proportion of cross-linking monomer used for a given quantity of the polymer, by increasing the molecular weight of the polymer employed in the system, or any combination of the above.

The gelled compositions based on an inorganic oxidizer can be employed for a variety of applications in which liquid aqueous acidic compositions are ordinarily employed, as an acidifying agent in mineralogical and other processes, in preparing salts, and in like operations. The gelled nitric acid compositions find particular merit as an oxidizing or nitrating acid in chemical synthesis in such applications when delayed action is desirable or required; inasmuch as the gels tend to release the acid slowly.

Several of the gelled acidic compositions based on nitric acid or an oxidizing salt are inherently satisfactory as detonating explosives without further additives, i.e., they can be detonated with moderate-strength primers in diameters of 6 inches or less under moderate conditions of confinement, such as provided by a borehole or a container of moderate wall thickness. However, for explosive applications, the compositions of this invention also preferably contain one or more fuels and/or sensitizers which are stable in the acid of the strength used in preparing the gels. Examples of nonexplosive fuels are the mono- and dinitro aromatic hydrocarbons, such as nitrobenzene, o-mononitrotoluene and dinitrotoluene; liquid and solid hydrocarbons and hydrocarbon fractions, particularly refined petroleum and mineral oils and the aromatic hydrocarbons, such as benzene, toluene, and the xylenes; carbohydrates, including various cellulose and starch products, e.g., cornstarch, potato starch, wood and paper pulps and sugars; siliceous fuels, including silicon itself and mixtures and alloys of silicon with heavy metals, e.g., ferrosilicon; and sulfurous fuels such as sulfur itself and pyrites. Metal fuels such as aluminum or ferrophosphorus are also useful in some of the gelled compositions, provided that they are, or can be made, sufficiently resistant to attack by the nitric acid. The gel copolymer per se acts as a fuel and except as otherwise indicated is included in calculating the amount of nonexplosive fuel and oxygen balance. Ordinarily, the gels for use as explosive compositions will be formulated to have an oxygen balance of about from −25 to +10 percent.

In addition to the nonexplosive fuels and/or sensitizers named above the explosive compositions of this invention can, in some embodiments, contain one or more additives of the art-recognized self-explosive type, provided that such additive is stable in the strengths of acidic composition used in preparing the gels. TNT, for example, exhibits a high degree of stability in all strengths of aqueous nitric acid and ammonium nitrate liquors and hence is a particularly useful additive of the "self-explosive" type. Examples of other "self-explosive" components which can be used in the compositions of this invention are RDX, HMX, tetryl, PETN, nitrocellulose, smokeless powder, and other organic nitramines, nitrates and nitrocompounds. For reasons of economy and compatibility, TNT is the preferred self-explosive for use in the compositions of this invention. The TNT or mixtures thereof e.g., with ammonium or sodium nitrate) can be introduced into the compositions in the form of crystals, grains, pellets, flakes, or other particulate form which allows ready dispersion thereof. In general, up to 85 percent, and preferably up to 40 percent, by weight of self-explosive additive based on weight of the composition can be used.

Stable, gelled nitric acid compositions found especially economical and efficient as detonating explosives comprise a uniform blend of:

a. about from 25 to 95 percent by weight of aqueous nitric acid having a strength of about from 50 to 99 percent, and preferably 65 to 98 percent;
b. about from 5 to 30 percent of a nonexplosive fuel, preferably selected from siliceous fuels, light metals, liquid and solid hydrocarbons, carbohydrates, sulfur, mono- and dinitro aromatic hydrocarbons, and mixtures of such fuels and/or sensitizers;
c. up to about 40 percent of a self-explosive sensitizer, particularly TNT;
d. up to about 50 percent of an inorganic oxidizing salt, typically an inorganic nitrate; and
e. an in situ copolymerization product of
   1. about from 0.1 to 10 percent and preferably 0.2 to 5 percent, based on the weight of aqueous nitric acid of at least one polymer as defined above, which preferably is formed from acrylamide, acrylonitrile, methacrylonitrile, or methacrylamide or is a copolymer of monoethylenically unsaturated monomers of this group, and
   2. about from 0.5 to 50 percent and preferably 0.1 to 10 percent by weight based on component (1) of a cross-linking monomer as defined above, and preferably N,N'-bis(hydroxymethyl)urea.

Particularly preferred explosive compositions based on inorganic oxidizing salts and having an oxygen balance of about from −25 to +10 percent comprise:

a. about from 20 to 70 percent ammonium nitrate;
b. up to 40 percent and preferably 10 to 25 percent sodium nitrate;
c. up to 40 percent and preferably 10 to 30 percent self-explosive;
d. up to 30 percent of metallic fuel, preferably 2 to 20 percent of aluminum and/or 5 to 25 percent of ferrophosphorus;
e. up to 10 percent of nonexplosive fuel, preferably selected from carbonaceous, siliceous or sulfurous fuels or combinations thereof;
f. from 5 to 45 percent and preferably 10 to 30 percent of water;
g. an in situ formed product of
   1. about from 0.1 to 10 percent and preferably 0.2 to 5 percent based on the aqueous phase of the composition of at least one polymer as defined above, and preferably a poly(acrylic amide) and
   2. about from 0.5 to 50 percent based on the weight of the polymer (1) of a cross-linking monomer as defined above, which monomer is preferably N,N'-bis(hydroxymethyl)urea.

In general, the gelled blasting compositions of this invention are prepared by blending of the ingredients, e.g., in a rotary-type mixer such as a "Lightnin" AG–100 mixer, keeping in mind the same general considerations for the control of the process as were discussed above. As mentioned, it is generally preferred to use preformed polymer to avoid the need for sparging and for maintaining the components while being blended under an inert gas atmosphere until polymerization is complete. Usually, the nitric acid is introduced into the mixing vessel first and the other ingredients added individually thereto while the contents of the vessel are being agitated. The cross-linking monomer is usually the last ingredient added. Agitation is usually continued until after the composition is gelled, particularly when the added fuels or sensitizers are solids such as for example, ferrosilicon, sulfur, aluminum, silicon, or starch, which must be distributed uniformly throughout the gel matrix. Where fuels or other additives of marginal stability or additives which inhibit polymerization are to be incorporated in the compositions, all ingredients except such additives can be mixed and gelled as previously described, then such additives blended with the finished gel.

As indicated above, for explosive applications preferred ranges of nitric acid strength are about from 60 percent (corresponding to a maximum water content of about 40 percent) to 97 percent. In general, the unit or bulk strength of an explosive composition based on gelled nitric acid increases with increasing strength of the nitric acid gelled. Accordingly gels of nitric acid of 85 percent strength or higher are usually employed where high bulk strength is a requisite, e.g., in the bottom of a borehole. The bulk or unit strength of an explosive composition, its relative ease of initiation, and its minimum critical diameter can also be regulated to a large degree by the type and quantity of fuel and/or sensitizer employed. Organic nitro compounds, typically mononitrotoluene, or dinitrotoluene, or in particular a self-explosive composition, especially TNT, are incorporated to provide compositions which are easily initiated, e.g., by a relatively small primer or by a blasting cap, in some cases, in small diameters. In many cases, a combination of fuels will be employed within the range of proportions indicated to give a composition having the desired physical and explosive properties.

Preferred gelling systems for explosive compositions comprise polymers of acrylonitrile, acrylamide, methacrylonitrile or methacrylamide, or copolymers thereof. The cross-linking monomer preferred is N,N'-bis-(hydroxyethyl)urea. In addition to being readily available at reasonable cost, these compositions are particularly effective in providing firm cohesive gels having viscosities within the desired range of 100,000 to 10,000,000 c.p.s. high surface tension as evidence by lack of stickiness or tackiness, ready workability, flexibility, water resistance, and other desirable physical characteristics in the as-made state. Further compositions including these preferred gelling systems retain their initial physical and explosive properties during storage after production. The preferred gelling systems also allow relatively wide latitude in the consistency of the explosive product made to fit the needs of a particular type of blasting.

This invention therefore provides simple and effective modified aqueous acidic compositions which are easier and safer to handle than those known heretofore and which have controlled free acidity and excellent stability. These and other properties of the gelled acidic compositions of this invention make the products of this invention particularly suitable as propellants, cleaning solutions, oil well treating agents, and etching compositions, in chemical syntheses, as an acidifying agent in mineralogical processes, in fertilizers, and in other uses where aqueous acid is now employed. In addition, physical properties such as cohesiveness, controlled flexibility and consistency and the ability to maintain dispersion of solids therein as well as their explosive properties make compositions of this invention, particularly those containing conventional fuels and sensitizers, readily adaptable to formulation in fixed plant facilities as well as mobile and other onsite equipment.

In the following examples which illustrate this invention, parts, percentages and ratios are by weight unless otherwise indicated. In the following examples, the terms noted below mean the following:

Very Firm—Viscosity of about from 3,000,000 to 10,000,000 c.p.s. as measured with TR[1] spindle at 0.5 r.p.m.[1] on the Brookfield Synchro-lectric Viscometer.

Firm—Viscosity of about from 1,000,000 to 3,000,000 c.p.s. measured with a TE[1] spindle at 1.0 r.p.m.[1] on a Brookfield Synchro-lectric Viscometer, Model RVT, with helipath attachment.

Medium Firm—Viscosity of about from 400,000 to 1,000,000 c.p.s. using the same conditions of measurement on the Viscometer.

Weak—Viscosities generally less than about 400,000 c.p.s., generally 200,000 to 400,000 c.p.s.

1. Changes in spindle and r.p.m. necessary to obtain accurate readings.

EXAMPLES 1–34

Gelled nitric acid compositions of this invention are prepared from the materials noted in table 1. The polymer is first dissolved and admixed in nitric acid of the strength indicated and the cross-linking monomer is then added with agitation, which is continued until gelation is substantially complete. The reaction temperature is as noted in the table. Gelation time refers to the interval of time between the addition of the last ingredient and the first appearance of gelled product. None of the gel products show visible signs of deterioration at ambient temperatures (ca. 20° to 25° C.) over periods of 1 week, the maximum periods of observation.

Explosive compositions are provided from the compositions in examples 1–34 by incorporating in the gelled composition a fuel, particularly a carbonaceous fuel or a mono- or dinitro-substituted aromatic compound, to give an oxygen balance of about from −10 to 0 percent.

| Example | Aq. $HNO_3$, strength percent | Polymer percent of $HNO_3$ | Crosslinking monomer, percent of polymer | Additive | Temp., ° C. | Gel product description and gel time |
|---|---|---|---|---|---|---|
| 1 | 70 | Polyacrylamide,[1] 1.2 | N,N′-bis(hydroxymethyl)urea, 6.6 | | 55 | Medium gel in 45 sec. |
| 2 | 70 | do [1] | N,N′-bis(hydroxymethyl)urea, 1.6 | | 55 | Medium firm gel in 2 min. |
| 3 | 70 | do [1] | N,N′-bis(hydroxymethyl)urea, 3.3 | | 25 | Firm gel in 45 min. |
| 4 | 70 | Polyacrylamide,[2] 3 | N,N′-bis(hydroxymethyl)urea, 13 | | 25 | Firm gel in 48 min. |
| 5 | 70 | Polyacrylamide,[3] 2 | bis(hydroxymethyl)urea, 10 | | 55 | Firm gel in 140 sec. |
| 6 | 80 | Polyacrylaimde,[4] 2 | Bis(hydroxymethyl)urea, 4 | | 50 | Firm gel in 27 sec. |
| 7 | 70 | Polyacrylamide,[1] 0.75 | N,N′-bis(hydroxymethyl)urea, 2.75 | | 50 | Weak gel in 9 min.; firm to medium gel in 2 hrs. |
| 8 | 70 | Polyacrylamide,[1] 1.2 | N,N′-bis(hydroxymethyl)urea, 6.6 | | 25 | Weak gel in 25 min.; firm gel overnight. |
| 9 | 80 | do [1] | N,N′-bis(hydroxymethyl)urea, 3.3 | | 35 | Medium gel overnight (thickened ca. 1 hr.). |
| 10 | 60 | do [1] | do | | 35 | Weak gel in 12 min.; medium gel in 14 min. |
| 11 | 70 | do [1] | do | $NH_4NO_3$, 20 percent | 35 | Medium gel in 15 min. |
| 12 | 70 | do [1] | N,N′-bis(hydroxymethyl)adipamide, 20 | | 55 | Gel in 47 sec. (explained later). |
| 13 | 70 | Polyacrylamide,[1] 1.6 | N,N′-bis(hydroxymethyl)adipamide, 10 | | 55 | Medium firm gel in 104 sec. |
| 14 | 70 | Polyacrylamide,[1] 2 | N,N′,N″-tris(hydroxymethyl)melamine, 10 | | 50 | Highly blown, yellow gel in 10 min. |
| 15 | 70 | Polyacrylamide,[1] 1.6 | N,N′,N″-tris(hydroxymethyl)melamine, 5.0 | | 25 | Weak gel in 1 hr. |
| 16 | 70 | do [1] | Bexakis(hydroxymethyl)melamine, 12.5 | | 50 | Firm gel in 2 min.; highly expanded by gas. |
| 17 | 70 | Polyacrylamide,[1] 1.2 | N,N′-bis(hydroxymethyl)sebacamide, 13.3 | | 50 | Weak gel in 8 min. |
| 18 | 70 | do [1] | N,N′-bis(methoxymethyl)urea, 3.3 | | 50 | Medium gel in 90 sec. |
| 19 | 95 | Polyacrylamide,[1] 0.6 | N,N′-bis(hydroxymethyl)urea, 8.3 | | 25 | Weak gel in 3 hrs.; medium gel in 3 days. |
| 20 | 75 | Polyacrylonitrile,[5] 1 | N,N′-bis(hydroxymethyl)urea, 5 | | 50 | Medium firm gel in 3 min. |
| 21 | 75 | do [5] | N,N′-bis(hydroxymethyl)urea, 10 | | 45 | Medium firm gel in 6 min.; became firmer on standing. |
| 22 | 95 | Polyacrylonitrile,[5] 0.75 | N,N′-bis(hydroxymethyl)urea, 13.3 | | 25 | Medium firm gel in 26 min. |
| 23 | 80 | Polyacrylonitrile,[6] 4 | N,N′-bis(hydroxymethyl)urea, 10 | | 50 | Cheese-like gel in ½ min. |
| 24 | 80 | Polyacrylonitrile,[7] 4 | N,N′-bis(hydroxymethyl)urea, 10 | | 50 | Medium firm gel in 13 min. |
| 25 | 70 | Copolymer of acrylonitrile and acrylamide,[8] 1.2. | Bis(hydroxymethyl)urea, 1.6 | | 35 | Medium firm gel in 3 min.; firm gel in 5 min. |
| 26 | 70 | Copolymer of acrylonitrile and acrylamide,[8] 0.75. | Bis(hydroxymethyl)urea, 5.3 | | 25 | Weak gel in 12 min. |
| 27 | 75 | Copolymer of acrylamide and acrylonitrile,[9] 1.2. | N,N′-bis(hydroxymethyl)urea, 6.6 | | 25 | Medium firm gel in 20 hrs. |
| 28 | 75 | Copolymer of acrylamide and acrylonitrile,[10] 1.2. | do | | 35 | Medium firm gel in 45 min. |
| 29 | 70 | Polyacrylamide,[1] 1.2 | N,N′-bis(hydroxymethyl)hexamethylenedinitramine, 10. | | 35 | Weak gel in 2 hrs. |
| 30 | 70 | do [1] | do | | 50 | Weak gel in 7.5 min. |
| 31 | 70 | do [1] | N,N′-bis(hydroxymethyl)-1,6-bis(methylsulfonamide)hexane, 6.6. | | 45 | Medium gel in 5 min. |
| 32 | 70 | do [1] | N,N′-bis(hydroxymethyl)-1,6-bis(methylsulfonamido)hexane 3.3. | | 45 | Weak gel in 5 min. |
| 33 | 70 | do [1] | N,N′-bis(hydroxymethyl)formamide ,6.6 | | 25 | Medium firm gel in 1½ hrs., firm overnight. |
| 34 | 70 | do [1] | do | | 50 | Firm gel within 25 min. |

[1] "Cyanomer" P–250—polyacrylamide available commercially from American Cyanamid Co.; molecular weight, 5–6 million.

[2] Acrylamide polymerized in situ in the nitric acid at 15° C. using initiator system of 0.14% ammonium persulfate, 0.04% $CuSO_4.5H_2O$ and 0.008% $N_2H_4.H_2O$; molecular weight, ca. ½ to 1 million.

[3] Cyanomer P–26—low molecular weight copolymer of acrylamide and acrylic acid available from American Cyanamid Co.

[4] Polyhall 295–M—polyacrylamide, commercially available from Stein-Hall Corp., contains about 12% acrylic acid in the form of sodium salt; molecular weight, 5–6 million.

[5] High molecular weight polyacrylonitrile prepared by emulsion polymerization as by Sorenson and Campbell, Preparative Methods of Polymer Chemistry, p. 169; molecular weight, 1.5 million; $\eta_{inh}=17.0$ in DMF at 25°.

[6] Low molecular weight polyacrylonitrile prepared by recipe in Sorenson and Campbell, p. 168; $\eta_{inh}=2$ in DMF at 25°.

[7] Scrap "Orlon"® polyacrylonitrile fiber; molecular weight, 50,000–70,000.

[8] High molecular weight copolymer prepared by emulsion polymerization and comprising 25% acrylamide and 75% acrylonitrile; prepared by emulsion polymerization by recipe in Encyclopedia of Polymer Science and Technology, vol. I, p. 400.

[9] Low molecular weight copolymer prepared by emulsion polymerization comprising 20% acrylamide and 80% acrylonitrile; prepared by method described in reference cited for footnote 8.

[10] Copolymer comprising 12.5% acrylamide and 87.5% acrylonitrile, prepared by method as described in reference cited for footnotes 8 and 9, above.

EXAMPLES 35–43

Aqueous solutions of ammonium nitrate (pH of about 5.5)

which are suitable for providing the aqueous phase of aqueous slurry blasting agents are gelled by combining ingredients as shown in table II following the procedures outlined for examples 1–34. In examples 35–38 and 42–43 the polyacrylamide is "Cyanomer" P-250, which has a molecular weight of 5,000,000–6,000,000. In examples 39–41, the polyacrylamide is prepared in situ in the ammonium nitrate solution in the presence of 0.014 percent ammonium persulfate. All examples are catalyzed by 0.8 percent of sulfuric acid.

polyacrylamide (commercially available as "Cyanomer" P-250) with N,N'-bis(hydroxymethy)urea. Various fuels and sensitizers as shown are incorporated in the formulations by first thoroughly blending all compositions except the N,N'-bis(hydroxymethyl)urea in the aqueous nitric acid, then adding this ingredient and finally continuing mixing for about 10 to 20 minutes, during which time the reaction runs substantially to completion.

The gelled formulations are loaded into 5-inch-diameter cartridges (20 lb./cartridge) and tested unconfined at 32° F. In each case, detonation of the charge is effected by a primer comprising 1 lb. (454 g.) of cast TNT.

TABLE 2

| Example | Polymer, percent of aq. $NH_4NO_3$ | Crosslinking monomer, percent of polymer | Additives, percent of aq. $NH_4NO_3$ | Temp., ° C. | Gel product description and gel time |
|---|---|---|---|---|---|
| 35 | Polyacrylamide, 1.2 | N,N'-bis(hydroxymethyl)urea, 6.6 | | 60 | Medium firm gel in 15 sec. |
| 36 | do | N,N'-bis(hydroxymethyl)urea, 3.3 | | 60 | Weak gel in 90 sec. |
| 37 | do | N,N'-bis(hydroxymethyl)urea, 6.6 | | 30 | Medium firm gel in 2½ min. |
| 38 | Polyacrylamide, 0.73 | N,N'-bis(hydroxymethyl)urea, 2.7 | $NaNO_3$, 25 | 60 | Firm gel in 13 sec. |
| 39 | Polyacrylamide, 0.64 | N,N'-bis(hydroxymethyl)urea, 3.1 | $NaNO_3$, 17 | 45 | Medium firm gel in 5 sec. |
| 40 | Polyacrylamide, 2.0 | N,N'-bis(hydroxymethyl)urea, 1 | | 45 | Firm gel in 3 min. |
| 41 | do | N,N'-bis(hydroxymethyl)urea, 0.5 | | 45 | Medium firm gel in 3 min. |
| 42 | do | N,N'-bis(methoxymethyl)urea, 6.6 | | 50 | Firm gel in 1 min. |
| 43 | do | N,N'-bis(methoxymethyl)urea, 6.6 | | 25 | Firm gel in 6 min. |

Explosive compositions are formulated from the aqueous gels of the foregoing examples by the admixture of at least one fuel or sensitizer in the proportions indicated above. For example, if about from 10 to 30 percent TNT is admixed with the finished gels, a cap-sensitive explosive composition results having an oxygen balance of about −10 to 0 percent. NCN gels are provided when the fuel used is a nonexplosive and particularly when a blend of carbonaceous, sulfurous, and, if desired, metallic fuels are employed to give compositions having an oxygen balance of about from −10 to 0 percent.

EXAMPLES 44–45

Gelled explosive compositions based on ammonium nitrate and of the formulation shown below are prepared as follows using a gelling system wherein polyacrylamide is formed in situ and subsequently cross-linked.

To aqueous ammonium nitrate solution at 65° C. are added sodium nitrate and monomeric acrylamide. Mixing is begun and continued about 3 minutes to assure uniform dispersion of ingredients. A 50 percent aqueous solution of ammonium persulfate is then added to initiate polymerization of acrylamide in situ.*(*The combining of ingredients and particularly the in situ formation of polymer are conducted under a blanket of nitrogen.) After about 10 minutes pellets of TNT are blended into the composition until complete incorporation and dispersion thereof are observed. N,N.-bis(hydroxymethyl)urea is then added as a cross-linking agent for the polyacrylamide. Gel formation is observed in about 5 minutes after this addition. The firm, gelled compositions are transferred into 5-inch diameter polyethylene bags (25 lb./bag). When detonation of the composition is initiated, in air, by two conventional primers, each comprising 1 lb. (454 g.) of cast TNT, the compositions detonate completely at the velocities shown.

| Example | 44 | 45 |
|---|---|---|
| Water | 22.47 | 14.35 |
| Ammonium Nitrate | 41.74 | 26.66 |
| Acrylamide | 2.05 | 1.23 |
| $(NH_4)_2S_2O_8$ | 0.98 | 0.68 |
| $NHO_3$, 75% concn* | 0.32 | 0.24 |
| $NaNO_3$ | 12.84 | 17.58 |
| TNT | 19.26 | 39.06 |
| N,N'-bis(hydroxymethyl)urea | 0.34 | 0.20 |
| Detonation Velocity, m./sec. | 2,380 | 5,400 |

*Catalyst to assure acidity.

EXAMPLES 46–47

Firm, gelled explosive formulations based on nitric acid as the oxidizing agent are prepared of the formulations shown below. Each composition is gelled by the in situ reaction of

| Example | 46 | 47 |
|---|---|---|
| 75% $HNO_3$ | 79.2 | 85.2 |
| Mineral Oil | 4.4 | 11.1 |
| Starch | 1.7 | 2.5 |
| Sulfur | 13.4 | — |
| Polyacrylamide | 1.2 | 1.2 |
| N,N'-bis(hydroxymethyl)urea, % by weight of composition | 0.1 | 0.005 |
| Detonation Velocity, m./sec. | 3,210 | 5,000 |

EXAMPLE 48

An explosive formulation of the composition summarized below is prepared basically as described in examples 46–47. This composition, which forms a firm gel, is transferred into 2¼-inch-diameter containers (200 g./container) and tested by actuating by a 50 g. RDX pellet.

| | |
|---|---|
| 75% $HNO_3$ | 85.1 |
| Starch | 2.5 |
| Mineral Oil | 11.1 |
| Copolymer of 75/25 acrylonitrile/acrylamide | 1.2 |
| N,N'-bis(hydroxymethyl)urea | 0.1 |
| Detonation Velocity, m./sec. | ca. 5,000 |

EXAMPLES 49–53

Explosive compositions as shown in table 3 are prepared as described in examples 46–47 using an aromatic nitro compound as a soluble sensitizer-fuel and copolymers of acrylamide and acrylonitrile as the polymer. D indicates the composition detonates when actuated by a conventional primer comprising 1 lb. of TNT.

TABLE 3

| | Example | | | | |
|---|---|---|---|---|---|
| | 49 | 50 | 51 | 52 | 53 |
| 75% $HNO_3$ | 78.0 | 78.0 | 78.0 | 72.0 | 78.0 |
| Copolymer: | | | | | |
| Acrylic terpolymer [1] | | | | 3.0 | |
| 25/75 acrylamide/acrylonitrile | 1.2 | | | | |
| 10/90 acrylamide/acrylonitrile | | 1.2 | | | 1.0 |
| 5/95 acrylamide/acrylonitrile | | | 1.2 | | |
| Nitrobenzene | 20.8 | 20.8 | 20.8 | | 21.0 |
| Dinitrotoluene, 26° | | | | 25.0 | |
| N,N'-bis(hydroxymethyl)urea | 0.05 | 0.05 | 0.05 | 0.05 | 0.1 |
| Gelling temperature, ° F | 70 | 70 | 70 | 70 | 70 |
| Gel time, hr | 1¾ | 2¼ | 1½ | 1¾ | 4 |
| Detonation results | D | D | D | D | D |

[1] Terpolymer consisting essentially of 93.7% polyacrylonitrile, 6% methyl acrylate, and 0.3% sodium styrene sulfonate.

EXAMPLES 54–56

Acids indicated in table 4 are gelled by the reaction of polyacrylamide ("Cyanomer" P-250) and N,N'-bis(hydroxymethyl)urea in situ basically as described in examples 1–34.

TABLE 4

| Example | Acid | Polyacrylamide, percent | N,N'-bis(hydroxymethyl)-urea, percent of polyacrylamide | Temp., °C. | Additives | Results |
|---|---|---|---|---|---|---|
| 54 | 37% HCl | 2.0 | 10 | 35 | | Firm gel instantly. |
| 55 | 37% HCl | 2.0 | 10 | 25 | | Do. |
| 56 | 60% acetic acid | 2.0 | 10 | 45 | $H_2SO_4$, 1.6% | Thickening in 10 min.; firm gel overnight. |

EXAMPLE 57

A copolymer of methyl vinyl ether and maleic anhydride (commercially available as Gantrez AN) is reacted with aqueous ammonia to give a polymer of the structure

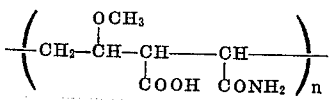

This polymer is dissolved in 80 percent nitric acid, the amount of polymer being 8 percent by weight of the acid. To this solution at 50° C. is then added 2.5 percent (based on the weight of the polymer) of N,N'-bis(hydroxymethyl)urea. A weak gel forms in 10 minutes.

I claim:

1. In gelled aqueous acidic compositions, the improvement which comprises providing a gelling system comprising the in situ cross-linked reaction product of A. at least one polymer containing a plurality of pendent groups selected from amide and nitrile functions, the amide nitrogen atoms bearing at least one hydrogen, and B. at least one cross-linking monomer containing a plurality of $—CH_2OR$ groups bonded to amido nitrogen, wherein R is selected from hydrogen and a lower alkyl of up to four carbon atoms.

2. A composition of claim 1 wherein said polymer comprises about from 0.1 to 10 percent by weight of the liquid acidic composition and the monomer comprises about from 0.5 to 50 percent by weight of the polymer.

3. A composition of claim 1 wherein the polymer is selected from the group consisting of:

A. polymers in which at least about 2 percent of the repeating units are

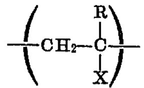

, wherein X is selected from —CN and

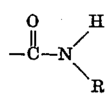

, the R's being independently selected from the group consisting of hydrogen, lower alkyl, hydroxyalkyl or cyanoalkyl radicals having up to four carbon atoms, and B. polymers containing recurring units of the formula

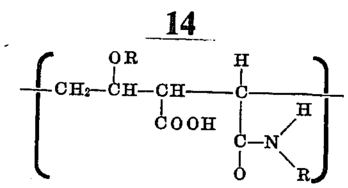

wherein R is as defined above.

4. A composition of claim 3 wherein the polymer comprises polyacrylamide.

5. A composition of claim 3 wherein the polymer comprises polyacrylonitrile.

6. A composition of claim 3 wherein the copolymer comprises a copolymer of acrylamide and acrylonitrile and each of said acrylamide and acrylonitrile comprises at least about 2 percent of said copolymer.

7. A composition of claim 3 wherein the cross-linking monomer comprises N,N'-bis(hydroxymethyl)urea.

8. A composition of claim 3 wherein the cross-linking monomer comprises N,N'-bis(hydroxymethyl)adipamide.

9. A composition of claim 3 wherein the cross-linking monomer comprises N,N',N''-tris(hydroxymethyl)melamine.

10. A composition of claim 3 wherein the cross-linking monomer comprises hexakis(hydroxymethyl)melamine.

11. A composition of claim 3 wherein the cross-linking monomer comprises N,N'-bis(hydroxymethyl)hexamethylenedinitramine.

12. A composition of claim 3 wherein the cross-linking monomer comprises N,N'-bis(hydroxymethyl)-1,6-bis(methylsulfonamido)hexane.

13. A composition of claim 3 wherein the cross-linking monomer comprises bis(hydroxymethyl)formamide.

14. A process for gelling aqueous acidic compositions which comprises bringing into contact, in an aqueous composition having a pH of less than 6, A. at least one polymer containing a plurality of pendent substituent groups selected from amide and nitrile functions, amide nitrogen atoms bearing at least one hydrogen and B. at least one cross-linking monomer containing a plurality of $—CH_2OR$ groups bonded to nitrogen wherein R is selected from hydrogen and lower alkyl of up to four carbon atoms.

15. A process of claim 14 wherein the polymer comprises about from 0.1 to 10 percent by weight of the total composition and said monomer comprises about from 0.5 to 50 percent by weight of said polymer.

16. A process of claim 15 wherein the polymer comprises polyacrylamide.

17. A process of claim 15 wherein the polymer comprises polyacrylonitrile.

18 A polymer of claim 15 wherein the monomer comprises N,N'-bis(hydroxymethyl)urea.

* * * * *